United States Patent [19]

Polacek

[11] Patent Number: 5,462,388
[45] Date of Patent: Oct. 31, 1995

[54] VIBRATOR WITH INCORPORATED ELECTRIC MOTOR

[75] Inventor: Manfred Polacek, Germering, Germany

[73] Assignee: Wacker-Werke GmbH & Co. KG, München, Germany

[21] Appl. No.: 182,064

[22] PCT Filed: May 6, 1993

[86] PCT No.: PCT/EP93/01107

§ 371 Date: Mar. 14, 1993

§ 102(e) Date: Mar. 14, 1993

[87] PCT Pub. No.: WO93/23641

PCT Pub. Date: Nov. 25, 1993

[30] Foreign Application Priority Data

May 11, 1992 [DE] Germany ............ 42 15 463.4

[51] Int. Cl.$^6$ ................................. B01F 11/00
[52] U.S. Cl. .................. 404/113; 366/123; 366/128; 404/116
[58] Field of Search .................... 404/113, 115, 404/116, 117, 133.05; 366/108, 123, 128

[56] References Cited

U.S. PATENT DOCUMENTS

| | | | |
|---|---|---|---|
| 3,784,168 | 1/1974 | Schneider et al. | 366/123 X |
| 4,199,271 | 4/1980 | Riedl | 404/113 |
| 4,667,916 | 5/1987 | Richards . | |

FOREIGN PATENT DOCUMENTS

| | | |
|---|---|---|
| 851908 | 9/1938 | France . |
| 2817170 | 10/1979 | Germany . |
| 3614748 | 2/1987 | Germany . |
| 3633857 | 4/1988 | Germany . |

*Primary Examiner*—Ramon S. Britts
*Assistant Examiner*—James A. Lisehora
*Attorney, Agent, or Firm*—Robert W. Becker

[57] ABSTRACT

A vibrator for compacting construction materials has a housing having a housing mantle with a first end face and a cylindrical interior. The housing has an upper part for closing the housing at the first end face. The upper part is axially inserted into the housing mantle and secured in a closing position thereof against axial displacement. A radially inwardly extending support surface is connected within the housing mantle. An electric motor is drivingly connected to an unbalanced shaft. The electric motor has an inner rotor end an outer cylindrical stator pack end is inserted into the housing mantle from the first end face. The stator pack has a recess and is inserted into the housing mantle with sliding fit and secured against rotation. A spreading element made of spring steel for securing the stator pack is inserted into the housing mantle through the first end face and positioned on the stator pack before closing the housing to be clamped between the support surface and the upper housing part. It has an axially extending projection for engaging the recess of the stator pack and a plurality of spreading pawls resting on the support surface. The spreading pawls are evenly spaced about the inner circumference of the housing mantle and are forced against the housing mantle when axially clamping the spreading element.

3 Claims, 2 Drawing Sheets

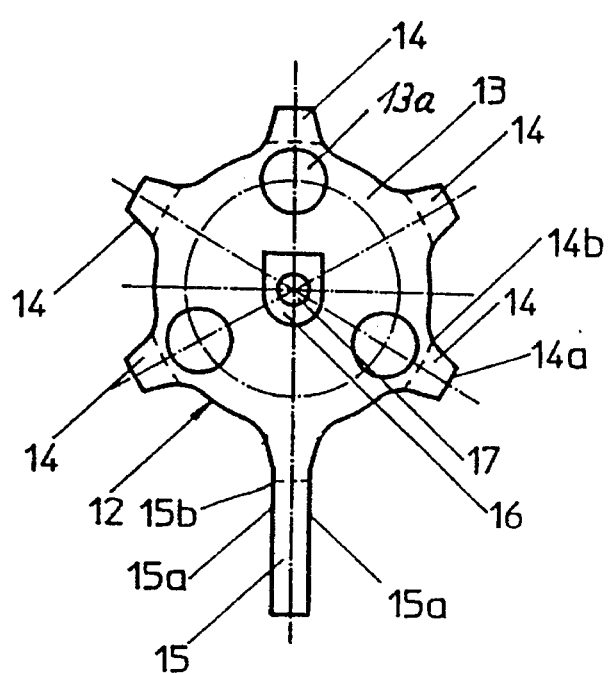
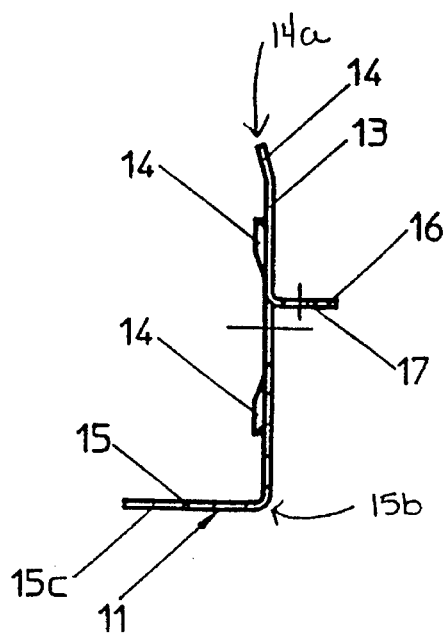
Fig. 2
Fig. 3

20
VIBRATOR WITH INCORPORATED ELECTRIC MOTOR

BACKGROUND OF THE INVENTION

The invention relates to a vibrator, especially inner vibrators, for compacting concrete etc. (construction material), having an unbalanced shaft that is driven by an electric motor with inner rotor mounted in the housing, the electric motor being insertable into the cylindrical interior enclosed by the housing mantle through an open end face, the electric motor having a cylindrical stator pack that is insertable with sliding fit into the housing mantle and that is secured against rotation relative to the housing mantle, wherein the housing mantle on the open end face is closeable by an upper housing part that is axially insertable into the housing mantle and in the closing position is secured against axial displacement within the housing mantle.

A securing of the stator pack against rotation is necessary for vibrators of the aforementioned kind because the counter torque acting during operation onto the stator pack would otherwise lead to a displacement of the stator pack in the circumferential direction of the housing mantle.

In the known vibrators of the aforementioned kind the stator pack is secured against rotation relative to the housing such that it is inserted under press-fitting conditions into the housing mantle. This requires a precise manufacturing of the inner surface of the housing mantle and the outer surface of the stator pack, the use of a press during mounting, and the use of a special removal device if demounting is required.

It is an object of the invention to provide a vibrator according to the preamble of claim 1 with which the stator pack and the inner surface of the housing mantle can be manufactured with greater tolerances as in the known vibrators and which is easy to mount and demount compared to the known devices.

SUMMARY OF THE INVENTION

The vibrator for compacting construction materials according to the present invention is primarily characterized by:

a housing having a housing mantle with a first end face, the housing mantle having a cylindrical interior;

the housing further comprising an upper part for closing the housing at the first end face of the housing mantle, the upper part axially inserted into the housing mantle and secured in a closing position thereof against displacement in an axial direction of the housing;

a support surface (end face of a ring) axially fixedly connected within the housing mantle and extending radially inwardly;

an unbalanced shaft;

an electric motor drivingly connected to the unbalanced shaft and positioned within the housing, the electric motor having an inner rotor and an outer cylindrical stator pack;

the electric motor inserted into the cylindrical interior of the housing mantle from the first end face;

the stator pack inserted into the cylindrical interior of the housing mantle with sliding fit and secured against rotation relative to the housing mantle;

the stator pack having a recess;

a spreading element made of spring steel for securing the stator pack, the spreading element inserted into the housing mantle through the first end face and positioned on the stator pack before closing the housing;

the spreading element clamped between the support surface and the upper part of the housing;

the spreading element having at least one axially extending projection for form-fittingly engaging the recess of the stator pack; and the spreading element further having a plurality of spreading pawls resting on the support surface, the spreading pawls being distributed evenly spaced about an inner circumference of the housing mantle and being forced against the housing mantle when axially clamping the spreading element.

Preferably, the spreading element is a planar flat stamped body with a first and a second side and has a circular center piece with bores for receiving voltage supply lines to the electric motor. The stamped body has tongue-shaped projections forming the spreading pawls and a further radial projection that is longer than the tongue-shaped projections and has parallel lateral edges. The tongue-shaped projections are bent relative to a plane of the center piece at an acute angle about a bending line that is tangential to the center piece to the first side, and the radial projection is bent a right angle relative to the plane of the center piece to the first side about a bending line that is tangential to the center piece.

Advantageously, the spreading element has a bracket with a bore at a center portion of the center piece that is formed as a unitary part by cutting a contour of the bracket into the center piece so as to form a contoured piece and bending the contoured piece about a bending line extending between ends of the contour at a right angle relative to the plane of the center piece to the second side.

The sliding fit provided in the inventive vibrator between the housing mantle and the stator pack simplifies the manufacture of these parts and also facilitates the mounting considerably because no machine tools are required. The vibrator thus can be manufactured in an economical and inexpensive manner and, in cases where a demounting of the stator pack is required, can be repaired. Despite the sliding fit the stator pack is reliably secured against rotation caused by counter torque due to the easily mountable spreading element.

BRIEF DESCRIPTION OF THE DRAWINGS

The invention will be described in detail in the following with the aid of the drawings and a specific embodiment.

It is shown in the drawings in:

FIG. 2 in a plan view a stamped body for forming the spreading element for the vibrator according to FIG. 1; and FIG. 3 a central longitudinal section in a side view of the stamped body of FIG. 2 of the spreading element.

DESCRIPTION OF PREFERRED EMBODIMENT

Figure 1:
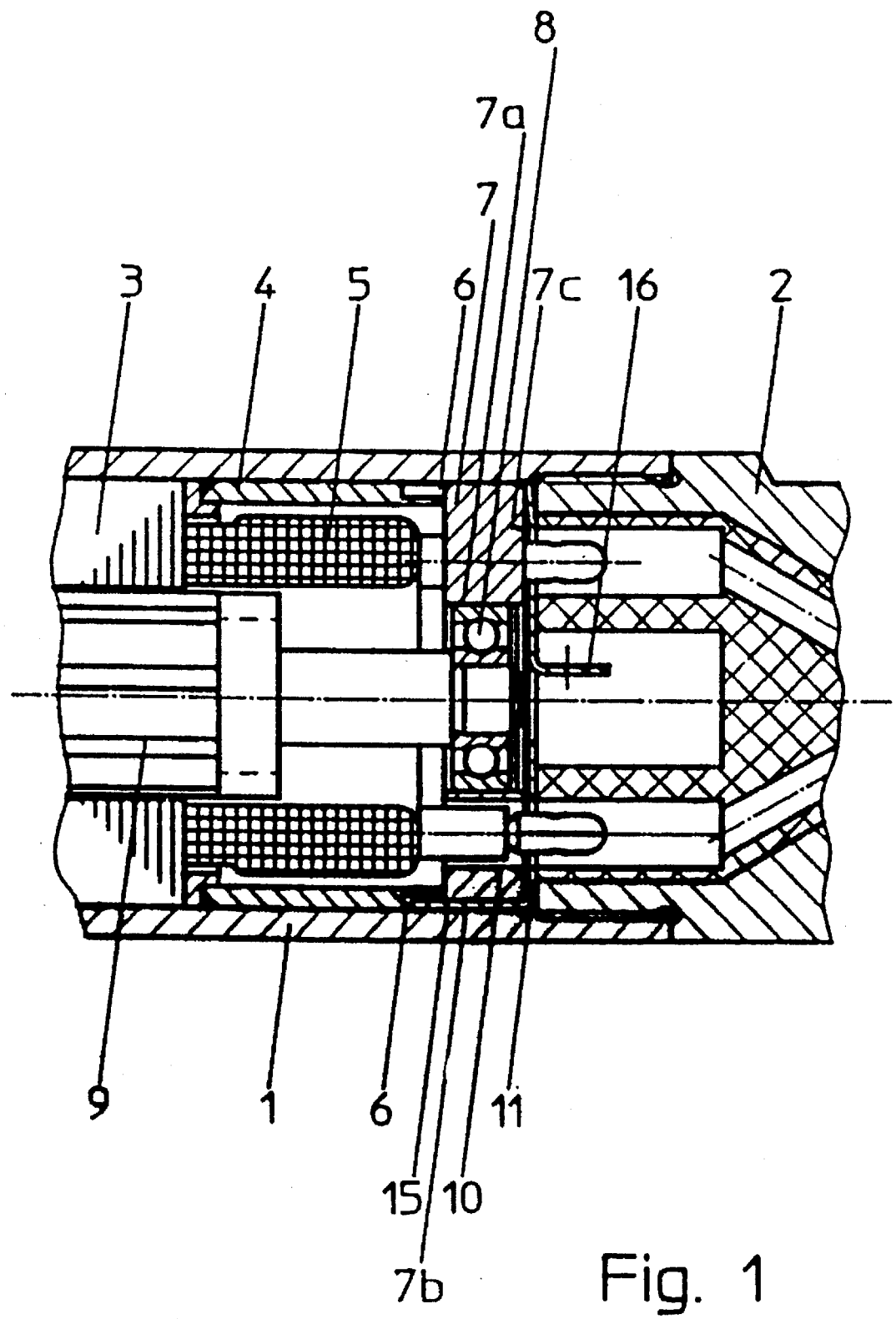
FIG. 1 the essential part of the inventively embodied inner vibrator, which is important for the invention, in an axial longitudinal section.

FIG. 1 shows the upper end of an inner vibrator in a longitudinal section which during operation is usually the upper end. The representation of other parts of the inner vibrator is not necessary because the vibrator is of an otherwise conventional construction.

As is common for inner vibrators, the vibrator has a longitudinal housing with a cylindrical housing mantle 1 which is open at one end and can be closed by an axially insertable upper housing part 2. In the embodiment represented in FIG. 1, the upper housing part 2 is screwable into the housing mantle 1 in a conventional manner.

The stator pack 3 of an electric motor is insertable through the open right end face (FIG. 1) of the housing mantle 1 in a sliding fit with respect to the inner wall surface of the housing mantle until it reaches a shoulder of the housing mantle 1 to the left ( not represented in the drawing FIG. 1). The insertion can be accomplished manually due to the sliding fit.

A sleeve-shaped spacer 4 that is also insertable into the housing mantle 1 in a sliding fit is positioned adjacent to the actual stator pack 3 to the right in FIG. 1. The spacer 4 is fixedly connected with its left end to the stator pack 3; as represented in the drawing, it is welded thereto and is somewhat longer than the coil head 5 of the stator windings. The spacer 4 together with the stator pack 3 thus forms a unitary part that can be inserted into the housing mantle 1 with a sliding fit.

The spacer 4 is provided with at least one axial longitudinal recess 6 that is open towards the outer surface and towards the free end face (to the right in FIG. 1) of the spacer so that in the inserted state the spacer is accessible from its free end face.

A massive ring 7 is positioned adjacent to the spacer 4 (to the right in FIG. 1) which ring has parallel end faces and is also insertable with a sliding fit into the housing mantle 1. The central bore 7a of the ring 7 receives a roller bearing 8 for the rotor 9 of the electric motor. The ring 7 is provided with a groove 7b that extends from one end face to the other and which is aligned with the recess 6 within the spacer 4 and has bores 10 for guiding therethrough electrical lines of the stator windings of which only one is shown in FIG. 1.

Between the right end face of the ring 7 which also serves for supporting the rotor 9 and between the upper housing part 2 a spreading element 11 is inserted which is shown separately in FIG. 3. The spreading element 11 secures the stator pack 3 together with the spacer 4 and also the ring 7 against rotation relative to the circumferential direction of the housing mantle 1, as will be explained in the following.

The spreading element 11 is manufactured from a planar and relatively thin, stamped body 12 comprised of spring steel and represented in FIG. 2. The stamped body 12 has a substantially circular center piece 13 with five laterally extending, tongue-shaped, relatively short projections 14. Four of the projections 14 are paired and positioned diametrically opposite one another. The outer edges 14a of all projections 14 are positioned on a circle that is concentric to the center of the center piece 13. A substantially longer radial projection 15 extends from the center piece 13 and projects radially outwardly past the tongue-shaped projections 14 and has parallel lateral edges 15a. The projection 15 is diametrically oppositely arranged relative to the fifth short projection 14.

The stamped body 12 is provided with bores 13a in its center piece 13 which correspond to the through openings 10 within the ring 7.

As can be seen in FIG. 3, the spreading element 11 is produced from the stamped body 12 such that the projections 14 and 15 are bent to the same side out of the plane of the center piece 13 about a bending line 14b for the short projections 14 and a bending line 15b for the longer projection. The bending angle for the longer projection 15 is 90°, but substantially smaller for the shorter projections 14 and selected such that the spreading action with a great pressure effect on the housing mantle 1 can be achieved, as will be described in the following.

In the bent state of the tongue-shaped projections 14 the free edges 14a are positioned on a circle having a diameter corresponding to the inner diameter of the housing mantle 1. The bending line 15b for the longer projection 15 is selected such that the outer surface 15c of the bent projection 15 has the same distance from the center axis of the center piece 13 than the free edges 14a of the bent short projections 14. With these dimensions the spreading element 11 is insertable into the housing mantle 1 in the manner shown in FIG. 1 so that the projections 14 with their free edges 14a extend to the housing mantle 1 and the long projection 15 extends with a portion thereof through the groove 7b within the ring 7 into the groove 6 within the spacer 4 (in FIG. 1 the lower one), whereby the long projection 15 rests with its outer surface 15c at the housing mantle. The short projections 14 rest in a slidable manner at the planar outer surface of the ring 7 that extends radially relative to the housing mantle 1.

The initially freely inserted spreading element 11 is axially clamped upon screwing the upper housing part 2 into the housing mantle 1. The tongue-shaped projections 14 are spread so that they are forced against the inner wall of the housing mantle 1 under great force and with their free edges 14a bite into the inner wall. They thus form spreading pawls that prevent a rotation of the spreading element 11 relative to the circumferential direction of the housing mantle 1 in a reliable manner. Accordingly, the ring 7 and especially the stator pack 3 that is fixedly connected to the spacer 4 are also secured against rotation via the long projection 15.

In the central portion of the center piece 13 a bracket 16 with a bore 17 is perpendicularly bent to the side of the spreading element facing away from the ring 7 which makes it possible that the spreading element 11 can be easily engaged and removed after removing the upper housing part 2.

The present invention is, of course, in no way restricted to the specific disclosure of the specification and drawings, but also encompasses any modifications within the scope of the appended claims.

What I claim is:

1. A vibrator for compacting construction materials comprising:

a housing having a housing mantle with a first end face, said housing mantle having a cylindrical interior;

said housing further comprising an upper part for closing said housing at said first end face of said housing mantle, said upper part axially inserted into said housing mantle and secured in a closing position thereof against displacement in an axial direction of said housing;

a support surface axially fixedly connected within said housing mantle and extending radially inwardly;

an unbalanced shaft;

an electric motor drivingly connected to said unbalanced shaft and positioned within said housing, said electric motor having an inner rotor and an outer cylindrical stator pack;

said electric motor inserted into said cylindrical interior of said housing mantle from said first end face;

said stator pack inserted into said cylindrical interior of said housing mantle with sliding fit and secured against rotation relative to said housing mantle;

said stator pack having a recess;

a spreading element made of spring steel for securing said stator pack, said spreading element inserted into said housing mantle through said first end face and positioned on said stator pack before closing said housing;

said spreading element clamped between said support surface and said upper part of said housing:

said spreading element having at least one axially extending projection for form-fittingly engaging said recess of said stator pack: and said spreading element further having a plurality of spreading pawls resting on said support surface, said spreading pawls being distributed evenly spaced about an inner circumference of said housing mantle and being forced against said housing mantle when axially clamping said spreading element.

2. A vibrator according to claim 1, wherein said spreading element is a planar flat stamped body with a first and a second side and having a circular center piece with bores for receiving voltage supply lines to said electric motor, said stamped body having tongue-shaped projections forming said spreading pawls and a further radial projection that is longer than said tongue-shaped projections and has parallel lateral edges, wherein said tongue-shaped projections are bent relative to a plane of said center piece at an acute angle about a bending line that is tangential to said center piece to said first side end wherein said radial projection is bent a right angle relative to said plane of said center piece to said first side about a bending line that is tangential to said center piece.

3. A vibrator according to claim 2, wherein said spreading element has a bracket with a bore at a center portion of said center piece that is formed as a unitary part by cutting a contour of said bracket into said center piece so as to form a contoured piece and bending said contoured piece about a bending line extending between ends of said contour at a right angle relative to said plane of said center piece to said second side.

* * * * *